United States Patent [19]
Mercer et al.

[11] 4,224,623
[45] Sep. 23, 1980

[54] LORAN-C CYCLE DETECTOR

[75] Inventors: William R. Mercer, Belmont, Mass.; William C. Wurst, Amherst; Lester R. Brodeur, Nashua, both of N.H.

[73] Assignee: Sanders Associates, Inc., Nashua, N.H.

[21] Appl. No.: 918,751

[22] Filed: Jun. 26, 1978

[51] Int. Cl.² .............................................. G01S 1/24
[52] U.S. Cl. .................................................... 343/103
[58] Field of Search ......................................... 343/103

[56] References Cited
U.S. PATENT DOCUMENTS
3,934,254  1/1976  Vogeler et al. ............... 343/103

Primary Examiner—Maynard R. Wilbur
Assistant Examiner—Richard E. Berger
Attorney, Agent, or Firm—Louis Etlinger; Joseph E. Funk

[57] ABSTRACT

A Loran-C receiver cycle detector is disclosed which processes Loran-C signal pulses on a cycle-by-cycle basis of the carrier frequency and generates an output for a specific carrier cycle. Due to received noise, sampling techniques are used to create a histogram which is analyzed to provide feedback used to accurately locate a tracking point on each Loran-C pulse.

8 Claims, 6 Drawing Figures

LORAN-C CYCLE DETECTOR

FIELD OF THE INVENTION

This invention relates to navigational equipment and more particularly to hyperbolic navigation equipment utilizing time difference of signal arrival measurements between shaped radio frequency pulses transmitted from synchronized ground transmitting stations.

BACKGROUND OF THE INVENTION

Loran-C is a pulsed, low-frequency, (100 Khz) hyperbolic radio navigation system. Loran-C radio navigation system chains employ three or more synchronized ground stations that each transmit periodic radio frequency pulse trains having, at the respective start of transmissions, a fixed time relationship to each other. The first station to transmit is referred to as the master station, while the other stations are referred to as the secondary stations. The pulse trains are radiated to receiving equipment generally located on aircraft or ships whose positions are to be accurately determined. Each pulse of the pulse trains transmitted by each of the master and secondary stations has an extremely accurate envelope shape; each pulse train is transmitted at a constant, precise repetition rate called the Group Repetition Interval; and each pulse in a group is separated in time from a subsequent pulse by a precise, fixed time interval. In addition, the secondary station pulse train transmissions are delayed a sufficient amount of time after the master station pulse train transmissions to assure that the time of arrival at receiving equipment anywhere within the operational area of the particular Loran-C chain will follow receipt of the pulse trains from the master station.

Since the series of pulses transmitted by master and secondary stations is in the form of pulses of electromagnetic energy which are propagated at a constant velocity, the difference in time of arrival of pulses for a master and a secondary station represents the difference in the length of the transmission paths from the transmitting stations to the Loran-C receiving equipment. The locus of all points on the Loran-C chart representing a constant difference in distance from a master and a secondary station, as indicated by a fixed time difference of arrival of the 100 Khz carrier pulse trains, is described by a hyperbola. The Loran-C navigation system makes it possible for a navigator to utilize this hyperbolic relationship for two or more pairs of stations to determine position using a Loran-C chart on which are located families of intersecting hyperbolic curves in a manner well known in the art. The modern-day Loran-C navigation system provides equipment position location accuracy within 200 feet with a repeatability of within 50 feet.

The discrete pulses radiated by each master and secondary Loran-C transmitter are characterized by an extremely precise spacing of 1000 microseconds between adjacent pulses. To insure such precise time accuracy, each master and secondary station transmitter is controlled by a cesium frequency standard clock and clocks of master and secondary stations are synchronized with each other.

To make precise time difference of signal arrival measurements a specific point on the waveform or the zero crossing of a specific carrier frequency cycle of each pulse must be located. The specific point or zero crossing is located and used to make the time difference of signal arrival measurements. In actual operation noise and spurious signals at and about the Loran-C carrier frequency makes the task very difficult.

The operation of the Loran-C radio navigation system is described in greater detail in a pamphlet put out by the Department of Transportation, United States Coast Guard, No. CG-462 dated August, 1974, entitled "Loran-C User Manual".

Thus, there exists a need in the prior art for apparatus and techniques used to accurately locate a specific point on each Loran-C pulse used to make accurate time difference of signal arrival measurements in the presence of noise and spurious signals which decrease the signal-to-noise ratio of the desired signal.

SUMMARY OF THE INVENTION

In accordance with the teaching of our invention we provide a solution to the need of the prior art with apparatus which uses sampling techniques, histograms and statistical techniques to mimimize the effect of noise and spurious signals to identify a marking point immediately preceding the desired specific point or zero crossing used in the art to make the time difference of signal arrival measurements. By having the marking point the immediately subsequent zero crossing is accurately pointed to and finding it amongst noise and spurious signals is made much easier.

Our invention will be better understood upon reading the following description in conjunction with the drawing in which.

DETAILED DESCRIPTION

In U.S. patent application Ser. No. 842,706 filed on Oct. 17, 1977, and entitled, "Loran-C Navigation Apparatus", is disclosed a Loran-C receiver which utilizes a microprocessor. The material in that application is incorporated herein by reference and the present invention may advantageously function with that apparatus. One function which the microprocessor accomplishes in conjunction with the circuitry disclosed therein, is to identify transmissions received from master and secondary stations of a selected Loran-C transmitter chain. This is accomplished by entering the Group Repetition Interval (GRI) for the selected Loran-C station chain into the microprocessor. The receiver utilizes the GRI to identify the transmissions from the master and secondary stations of that chain from amongst all received signals at the 100 Khz carrier frequency. Once the microprocessor has located the transmissions from these stations, it is able to calculate the time of signal arrival of subsequent pulse train transmissions from the transmitting stations of the selected chain. The pulse trains from the master and secondary stations are initially received at the calculated time, but then it is required to be more exact and identify a specific point or carrier frequency zero crossing of each pulse of the pulse trains. The specific zero crossing of each pulse is used to make the time difference of signal arrival measurements so well known in the art. The prior art teaches many arrangements for locating a point on the pulse waveform corresponding to the specific carrier frequency zero crossing, typically the third zero crossing.

Figure 1:
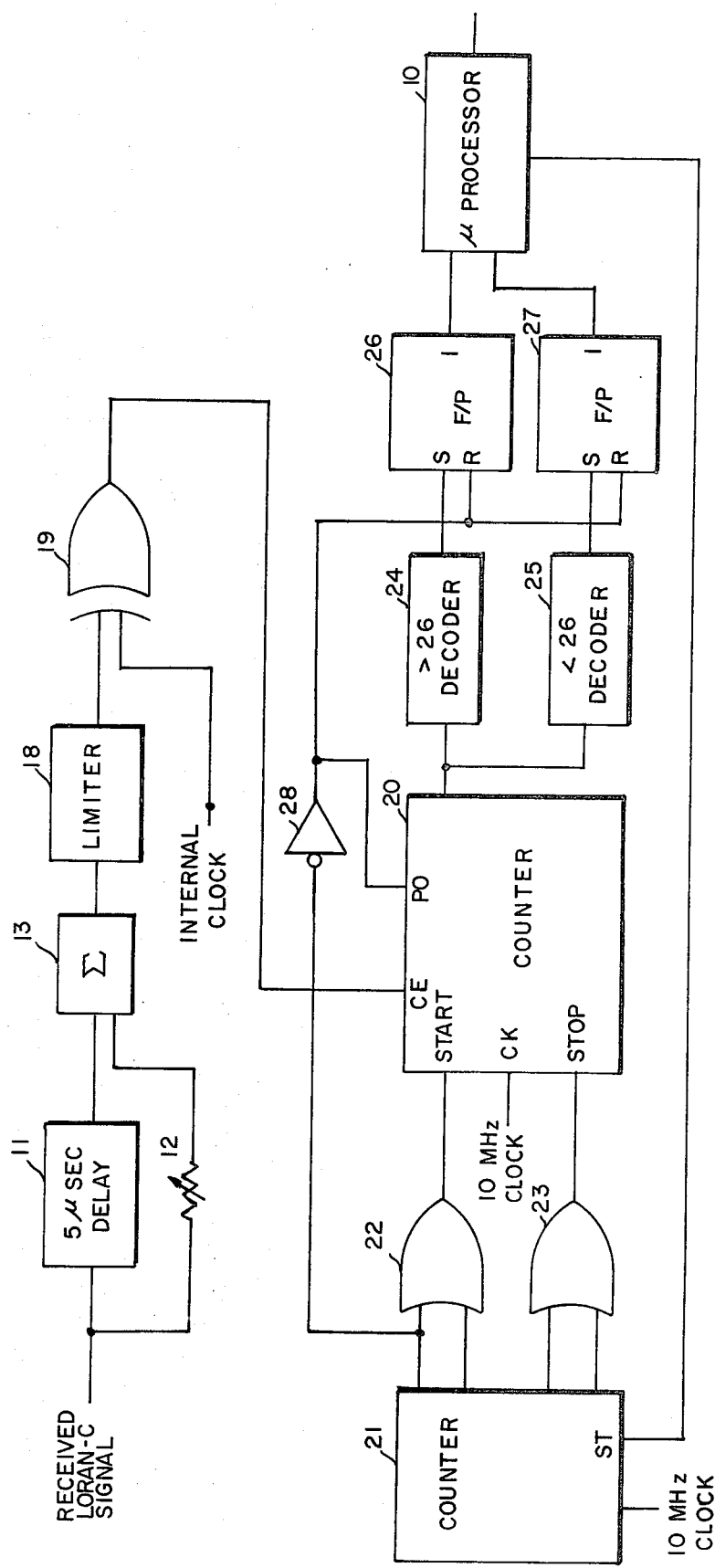
FIG. 1 is a detailed block diagram of our invention.

Turning now to FIG. 1, therein is shown a detailed block diagram of our invention which can function with the Loran-C receiver disclosed in the cited patent application to improve the ability of the receiver to locate the specific point of each Loran-C pulse used to make required time difference of arrival measurements and thereby increases the reliability of Loran-C receivers.

Figure 2:
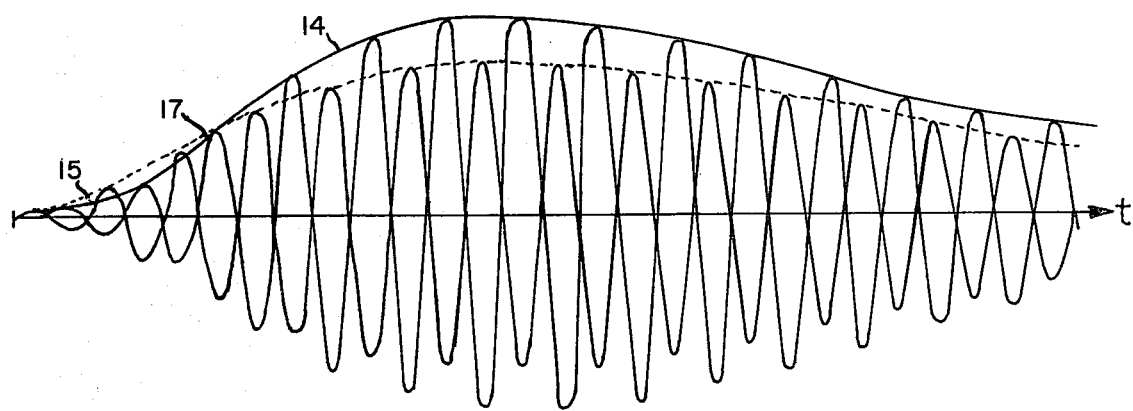
FIGS. 2 and 3 show the radio frequency Loran-C signal pulse input to our invention and a new radio frequency signal derived therefrom.
Figure 3:
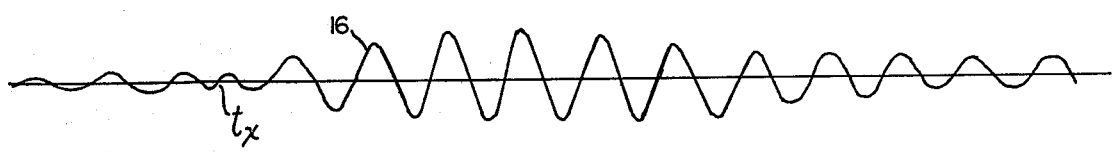

Each received and undemodulated Loran-C pulse is applied to 5 microsecond delay line 11 and to variable resistor 12. The output of delay circuit 11 and resistor 12 are input to summing circuit 13 which sums the two signals being input thereto on a point-by-point, cycle-by-cycle basis to produce an output signal having a different waveform but of the same frequency as the input signals. The signals input to summing circuit 13 are shown in FIG. 2, while the signal output from summing circuit 13 is shown in FIG. 3. In FIG. 2, the sinusoidal signal designated by waveform envelope 15 has the same envelope shape and same phase as the received and undemodulated Loran-C signal. Variable resistor 12 attenuates the received and undemodulated signal to produce the signal represented by waveform 15. Five microsecond delay circuit 11 shifts the phase of the whole received signal by 180° while introducing little or no loss and the signal output from the circuit is represented by the sinusoidal signal having the waveform 14. The adjustment of variable resistor 12 is described hereinafter.

While variable resistor 12 and delay line 11 are disclosed as the preferred embodiment for long term circuit stability and to produce the signals 14 and 15 having the relationship shown in FIG. 2, many other circuit arrangements may be employed to achieve the same result. For one example, in the two parallel paths transmission means resistor 12 may be replaced by a plain wire path and transmission means delay line 11 may be replaced by a single, adjustable amplifier stage which can introduce the desired 180° phase shift while providing for the signal passing therethrough to have a greater amplitude than the signal passing through the wire. This will yield the same signals 14 and 15 shown in FIG. 2. The same result may be accomplished with active and passive components in both paths.

Summing circuit 13 processes or algebraically combines the two sinusoidal signals 14 and 15 input thereto on a point-by-point, cycle-by-cycle basis in a subtractive manner, due to these two signals being 180° out of phase with each other, to produce an output signal having the waveform 16 shown in FIG. 3. It may be seen that the frequency of the output signal 16 is the same as the frequency of the two signals input to summing circuit 13. However, up to time $T_x$, the output signal 16 is in phase with signal 15, but thereafter undergoes a 180° phase shift and signal 16 is then in phase with signal 14. The phase is determined by the one of the signal input to summing circuit 13 having the greater amplitude and the phase change point is therefore determined by the setting of variable resistor 12. Variable resistor 12 is adjusted so that signals 14 and 15 cross each other at point 17 which needs only be within the negative portion of the third carrier cycle of undelayed signal 15. Prior in time to point 17, which corresponds to time $T_x$, the amplitude of each cycle of signal 15 is greater than the amplitude of each cycle of signal 14, and this causes output signal 16 from summing circuit 13 to be in phase with signal 15. After time $T_x$, however, the amplitude of each cycle of signal 14 is greater than the amplitude of each cycle of signal 15 and output signal 16 is in phase with signal 14 as shown. The phase reversal is adjusted to take place during the 5 microsecond half cycle and more particularly to point 17 as shown in FIG. 2 in this embodiment of the invention.

In practice, however, variable resistor 12 may be adjusted such that the crossover point 17 of signals 14 and 15 in FIG. 2 occurs anywhere within plus or minus 2.5 microseconds of time $T_x$ as indicated in FIG. 3. This is any time during the negative half cycle of the third full cycle of signal 15.

Figure 4A:
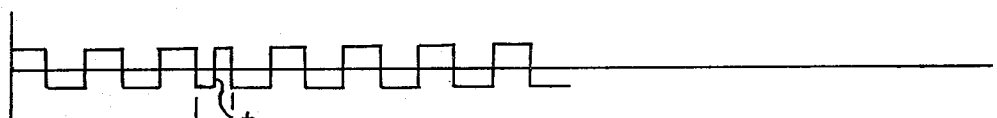
FIG. 4 shows the steps of processing the newly derived radio frequency signal shown in FIG. 3 to find the marking point used to locate the zero crossing used to make time difference of signal arrival measurements.

Signal 16 in FIG. 3 is output from summing circuit 13 in FIG. 1 and applied to limiter 18 which converts the radio frequency signal to a square wave by clipping the signal amplitude in a well-known manner to produce the waveform shown in FIG. 4A. The phase reversal which occurs at time $T_x$ is also shown in this figure.

Figure 4B:
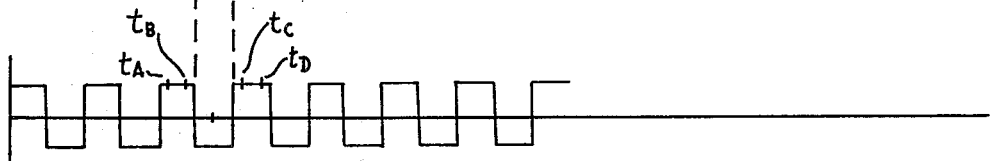
Figure 4C:
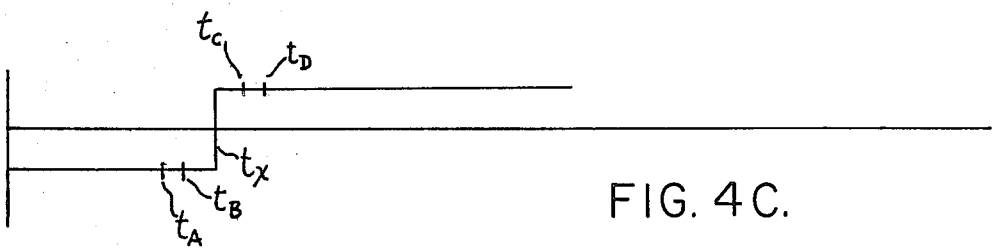

The squared signal output from limiter 18 is input to exclusive OR gate 19. There is a second input to exclusive OR gate 19 from a clock internal to the Loran-C equipment. The waveform of this clock signal is shown in FIG. 4B and is controlled by the Loran-C equipment, has the same frequency and phase, including phase code reversals, as the received and undemodulated Loran-C pulses. This is done under the control of microprocessor 10 after the master and secondary stations of the selected Loran-C chain have been located. Exclusive OR gate 19 operates in a manner well known in the art and prior to time $T_x$ when the signals input to gate 19 as shown in FIG. 4A and FIG. 4B are in phase with each other, there is no output from gate 19. However, after time $T_x$ due to the phase reversal created by the action of summing circuit 13, it may be seen in FIGS. 4A and 4B that the signals input to gate 19 are no longer in phase with each other. As a result, starting at time $T_x$ the output of exclusive OR gate 19 goes high as shown in FIG. 4C. The high output from gate 19 is applied to counter enable input CE of counter 20 to enable this counter to operate in response to start and stop signals which will be described hereinafter.

As is known in the prior art, the pulse train output from a master station consists of eight pulses spaced exactly 1000 microseconds apart and a ninth pulse spaced exactly 2000 microseconds from the eighth pulse. Thus, a master station pulse train occupies a period of 10,000 microseconds. Each secondary station has eight pulses spaced exactly 1000 microseconds apart but does not have the ninth pulse which distinguishes the master station. Counter 21 in FIG. 1 has a maximum count of 9,999 and is under the control of microprocessor 10 at the start input ST. Counter 21 does not count all the time but only when enabled by microprocessor 10. As mentioned briefly heretofore the Loran-C receiver equipment including microprocessor 10 locates the transmissions from the master and each of the secondary stations from a selected Loran-C transmitter chain. After locating the signals transmitted by the master and secondary stations of the selected Loran-C chain at the GRI rate, microprocessor 10 calculates the time of arrival of subsequent received signals from these stations. At the calculated start time of the first pulse of the pulse train from a master or secondary station, microprocessor 10 momentarily energizes input ST of counter 21 to start the counter counting the 10 MHz clock input thereto. At the end of counting up to a full count corresponding to 9,999 microseconds, counter 21 shuts itself off, clears itself, and does not restart counting until its input ST is again energized by microprocessor 10 at the beginning of a subsequent pulse train.

As may be seen in FIG. 1 there are four outputs from counter 21 which sequentially go high once for each pulse of the pulse trains from both the master and seondary stations. That is, each of these four outputs momentarily goes high once every 1000 microseconds. These times are represented by $T_a$, $T_b$, $T_c$ and $T_d$ in FIG. 4B. Two of the outputs are input to OR gate 22 and represent times $T_a$ and $T_c$. The other two outputs from counter 21 are input to OR gate 23 and represent the times $T_b$ and $T_d$. The output of OR gate 22 is input to the start input of counter 20 while the output of OR gate 23 is applied to the STOP input thereof. When counter 20 is enabled to count, it counts pulses from a 10 Mhz clock applied to its clocking input CK. Thus, as generally represented in FIGS. 4B and 4C, counter 20 is enabled to count at time $T_a$ and is then disabled from counting at time $T_b$. Immediately thereafter, counter 20 is again enabled to count at time $T_c$ and is then disabled from counting at time $T_d$. These start and stop times open and close two 2.6 microsecond search windows set on either side of time $T_x$ for each pulse as shown in both FIGS. 4B and 4C. In each of these search windows, the output of exclusive OR gate 19 as shown in FIG. 4C is sampled twenty-six times each at 0.1 microsecond spacing. The results of this sampling and storing is to create a histogram which is stored in counter 20, decoded and checked by decoders 24 and 25 and finally analyzed by microprocessor 10. The search windows may be other than 2.6 microseconds wide and there may be many search windows.

In the ideal case, with no received noise or spurious signals, the zero to one transition of the signal output from exclusive OR gate 19 as shown in FIG. 4C is exactly stable at time $T_x$. However, in actual operation, noise and spurious signals cause this transition to fluctuate, that is not occur at precise time intervals. In addition, momentary spike-like transitions occurring prior to or after time $T_x$ can also be mistakenly identified as the desired transition at time $T_x$ and degrade reliable Loran-C receiver operation.

To minimize the effect of the random fluctuation of the transition centered on time $T_x$ of FIG. 3C, the technique of utilizing search windows between times $T_b$ and $T_a$ and times $T_c$ and $T_d$ and sampling and storing to create histograms is utilized. More particularly, twenty-six samples are taken within each search window and a histogram analysis is made be decoders 24 and 25 in conjunction with microprocessor 10. The result of this histogram analysis minimizes the possibility of the circuitry using an erroneous specific tracking point to make time difference of signal arrival measurements.

In the ideal signal case with no transients or fluctuations as shown in FIG. 4C, at any time prior to time $T_x$ the output of exclusive OR gate 19 in FIG. 1 is low and does not enable counter 20. At time $T_a$ OR gate 22 enables the start input of counter 20 as mentioned previously, but cycles of the 10 MHz clock input to counter 20 cannot be counted as counter enable input CE is not energized by gate 22. Thereafter, OR gate 23 provides a stop signal to counter 20 at time $T_b$ which is 2.6 microseconds later than start signal $T_a$. In this case counter 20 has a zero count therein immediately following the search window between $T_a$ and $T_b$. The zero count is detected by decoder 25 which provides an output to set flip-flop 27 to its one state whenever there is a count less than 26 in counter 20. Microprocessor 10 detects the set or one state of flip-flop 27 as an indication that the signal level prior to time $T_x$ is at a zero level as depicted in FIG. 4C.

In the event transients occur within the search window between times $T_a$ and $T_b$, the transients each cause counter enable input CE of counter 20 to go high. For the extremely brief period of time defined by the transients within the search window, a cycle of the 10 MHz clock applied to clocking input CK is counted by counter 20. If more than one transient appears within this first search window, multiple counts will appear in counter 20. Statiscally, the number of counts in counter 20 will be less than fourteen for the search window defined by $T_a$ to $T_b$ when the signal level is zero. The less than fourteen count is detected by decoder 25 which places flip-flop 27 in its set state. In turn, the output of flip-flop 27 goes high giving an indication to microprocessor 10 of the zero state of the signal within the search window from $T_a$ to $T_b$.

For a perfect received signal with no noise or spurious signals the output from exclusive OR gate 19 will always be high during the search window between times $T_c$ and $T_d$ which must be adjusted to occur after time $T_x$. During this latter search window which is also of 2.6 microseconds duration in this embodiment of my invention there will also occur twenty-six pulses from the 10 MHz clock applied to clocking input CK of counter 20 resulting in a count of twenty-six being stored in counter 20. This count of twenty-six is detected by decoder 24 as being a count greater than thirteen which places flip-flop 26 in its set state. Flip-flop 26 being in its set state provides an indication to microprocessor 10 that the signal level occurring within the $T_a$–$T_b$ search window is at one level.

Noise transients occurring within the search window between $T_c$ and $T_d$ will cause the one level to go to a zero level. This means that the output of exclusive OR gate 19 goes to zero during this latter search window for each transient, which in turn disables counter 20 from counting a cycle of the 10 MHz clock. Statistically, transients will not cause a count of less than fourteen in counter 20 between times $T_c$ and $T_d$ if counter 21 is started at the proper time by microprocessor 10. The greater than fourteen count in counter 20 is detected by decoder 24 which places flip-flop 26 in its one state. Microprocessor 10 takes the one output of flip-flop 26 to indicate that the signal level within the search window between $T_c$ and $T_d$ is at a one level.

With the operation of the circuitry in FIG. 1 just described, it can be seen that the circuitry develops and analyzes a histogram within each of the two search windows that should be on either side of the transition occurring at time $T_x$ which points to the desired cycle of the carrier frequency which occurs immediately thereafter. The effect of the histograms is to statistically eliminate the effect of noise transients and spurious signals that occur within the 2.6 microseconds search windows that microprocessor 10 shifts to be placed on either side of the transition at time $T_x$. Thus, time $T_x$ can be located within a few microseconds despite noise and spurious signals which cause the transition to randomly move to either side of time $T_x$. Thus, the desired zero crossing of each Loran-C pulse occurring immediately after the transition at time $T_x$ is easier to locate and time difference of Loran-C signal arrival measurements are made more accurately, even in noisy signal environments wherein the signal-to-noise ratio of the received signal is low.

The circuit operation just described wherein the two search windows straddle the transition at $T_x$ is premised on the assumption that microprocessor 10 functioning with other Loran-C receiver circuitry not shown or described herein, but described in the aforementioned patent application has started counter 21 at the proper time. In reality this does not occur because in the rough search mode the tracking point of each pulse is not determined within a few microseconds. Thus, the two search windows may not initially be one on either side of the transition at time $T_x$. If both search windows initially occur prior to the transition at time $T_x$, the histogram assembled by counter 20 and detected by decoder 25 provides a zero count indication to microprocessor 10 for both search windows. Microprocessor 10 responds to this zero-zero histogram indication to increment the calculated time of arrival of the pulse trains from the master and secondary station by increments of 10 microseconds and enables counter 21 to start counting at a later time equal to the increment. The process described for the circuitry of FIG. 1 is then repeated and microprocessor 10 again analyzes the results. If the result is again a zero-zero count for both search windows, microprocessor 10 again increments the calculated time of arrival of the signals from a Loran-C station until the desired zero-one histogram counts occur indicating that the transition at time $T_x$ has been located.

In a similar manner, if microprocessor 10 receives an indication of a one count within both search windows, the calculated time of arrival of the Loran-C signals is decremented and the procedure is repeated. This decrementing or incrementing process is continued until microprocessor 10 receives a zero count for the search window occurring between times $T_a$ and $T_b$ and a one count for the search window occurring between times $T_c$ and $T_d$. In this manner, circuitry of FIG. 1 functioning in conjunction with microprocessor 10 accurately locates the transition at time $T_x$ and knows that the next positive zero crossing of the carrier is the point of the received pulse signal used to make the time difference of signal arrival measurements.

While that which has been described hereinabove is at present considered to be the preferred embodiment of the invention, it is illustrative only and the rapid changes in technology will make various changes and modifications obvious to those skilled in the art without departing from the scope of the invention as claimed below. Thus, for example, the number of search windows or the width of the search windows may be varied, the counts received within each search window to construct a histogram may be varied and the cross over point of the two signals summed by summer 13 may be varied.

What we claim is:

1. Apparatus used in locating a specific cycle zero crossing of received radio frequency signal pulses comprising:

a first transmission means to which said signal pulses are applied to be scaled in amplitude by a known scaling factor before being output therefrom;

a second trasmission means to which said radio frequency signal pulses are applied to be delayed in time before being output therefrom, the amplitude of said signal pulses output from said second transmission means being different than the amplitude of said signal pulses output from said first transmission means;

means for algebraically combining the signals output from said first and said second transmission means to produce a first radio frequency signal having a phase reversal caused by the unequal amplitudes of the signal pulses input thereto, said phase reversal used to locate a first point of each received signal pulse, means for generating timing signals defining one or more search windows each having a known time reference in which said first signal is sampled;

means for sampling and storing said first signal in each of said search windows; and means for analyzing said samples, with the results of said analysis being used to modify said time reference to find said first point used to locate said specific point.

2. A method for locating a specific radio frequency carrier cycle zero crossing of received signal pulses comprising the steps of:

modifying each of said radio frequency signal pulses in their undemodulated form to scale their amplitude and delay same with respect to the received signal pulses, algebraically combining each of said radio frequency signal pulses in their undemodulated form with said modified signal pulses on a point-by-point, cycle-by-cycle basis to derive a first signal for each pulse, said first signal having the same frequency as said received signal pulses and being in phase therewith up to a first point after which there is a phase shift, detecting said first signal to provide a second signal for each of said pulses, said first signal output having a first state prior to said first point and having a second state subsequent to said first point, sampling each of said second signals at known time reference points, statistically analyzing the samples obtained from said sampling to determine the state of said second signals at said sampling points, modifying the known sampling reference points responsive to the results of said statistical analysis so that sampling occurs before and after said first point of each of said second signals with all said sampling occurring before said specific cycle zero crossing, to closely determine the time of occurrence of said first point, the time reference detection of said first point used to locate said specific carrier cycle zero crossing.

3. The invention in accordance with claim 1 wherein said processing means further comprises:

means for converting said first radio signal into a square wave having the same frequency and in phase with said first radio signal;

a source of square wave signals having the same phase and frequency as the radio frequency carrier of said received signal pulses; and comparator means comparing said first radio signal converted to a square wave with said signal from said square wave source and providing a first output signal having a first state prior to said phase reversal of said first signal and a transition to a second state subsequent thereto, said transition occurring close in time to said specific point and being used to detect said specific point.

4. The invention in accordance with claim 3 wherein said sample and store means comprises:

a clock pulse source;

a counter jointly responsive to said signal generating means defining search windows and to said first output signal to count pulses from said clock pulse source during the period of each of said search windows, the pulse count in said counter being analyzing means to determine if said first signal is in said first state or said second state.

5. The invention in accordance with claim 3 wherein said second transmission means comprises a delay line and said radio frequency signal pulses applied thereto are delayed an odd multiple of one-hundred eighty degrees before being input to said combining means.

6. The invention in accordance with claim 5 wherein said comparator means comprises an exclusive OR logic gate, said first state output is a logic zero output and said second state output is a logic one output.

7. The invention in accordance with claim 1 wherein said one or more search windows comprise at least two search windows with one window to occur before and one window to occur after said first signal transition for each signal pulse, and a multiplicity of samples are taken within each search window each sample indicating if said first signal is in a first or a second state, and wherein said analyzing means comprises:

a first checking means checking said multiplicity of samples and providing an indication when said samples indicate said first signal is at said first state; and a second checking means checking said multiplicity of samples and providing an indication when said first signal is at said second state, said first checking means to indicate said first signal is at said first state during said search window preceding said transition and said second checking means to indicate said first signal is at said second state during said search window following said transition when said time reference of said search windows is correct.

8. The invention in accordance with claim 5 wherein a specified number of samples are taken in each of said search windows and wherein said first checking means comprises a first decoder which provides an output when the sample count in said sample and store means is less than half said specified number and indicates said first signal statistically is in said first state, and wherein said second checking means comprises a second decoder which provides an output when the sample count in said sample and store means is greater than half said specified number and indicates said first signal is statistically in said second state.

* * * * *